(12) United States Patent
Aizawa (10) Patent No.: US 9,584,640 B2
(45) Date of Patent: Feb. 28, 2017

(54) PORTABLE INFORMATION PROCESSING DEVICE, OUTPUT CONTROL METHOD FOR A PROJECTOR, AND RECORDING MEDIUM

(71) Applicant: CANON KABUSHIKI KAISHA, Tokyo (JP)

(72) Inventor: Michio Aizawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/658,636

(22) Filed: Mar. 16, 2015

(65) Prior Publication Data
US 2015/0281418 A1   Oct. 1, 2015

(30) Foreign Application Priority Data
Mar. 26, 2014   (JP) .................................. 2014-063733

(51) Int. Cl.
H04M 1/00   (2006.01)
H04M 1/21   (2006.01)
H04M 1/725   (2006.01)
H04B 1/38   (2015.01)

(52) U.S. Cl.
CPC ......... *H04M 1/21* (2013.01); *H04M 1/72527* (2013.01); *H04M 1/72533* (2013.01); *H04M 2250/12* (2013.01)

(58) Field of Classification Search
CPC ................................ G03B 21/00; G03B 21/28
USPC ............................. 455/556.1–556.2; 345/156
See application file for complete search history.

(56) References Cited

U.S. PATENT DOCUMENTS 8,608,321 B2 * 12/2013 Jung ...................... G03B 21/00
                                                                353/121

FOREIGN PATENT DOCUMENTS

JP         2009-003281 A       1/2009

* cited by examiner

*Primary Examiner* — Lee Nguyen
(74) *Attorney, Agent, or Firm* — Fitzpatrick, Cella, Harper & Scinto (57) ABSTRACT

A portable information processing device, including a main body comprising a projector configured to project an image; a state detection unit configured to detect a state of the main body; and an output control unit configured to control an output of the projector based on the state of the main body detected by the state detection unit.

24 Claims, 9 Drawing Sheets

PORTABLE INFORMATION PROCESSING DEVICE, OUTPUT CONTROL METHOD FOR A PROJECTOR, AND RECORDING MEDIUM

BACKGROUND OF THE INVENTION

Field of the Invention

The present invention relates to a portable information processing device, an output control method for a projector, and a recording medium.

Description of the Related Art

As the types of projector configured to project an image onto a projection surface such as a screen, there has been known a projector that is small in size and portable, in addition to a projector to be fixed to a ceiling or wall for use and a projector to be placed on a desk in a stationary manner. Some of the small and portable projectors are built into portable information processing devices, as in the case of a mobile phone having a projector function. Although the small and portable projector can be used with ease, the projection direction of this type of projector may be deviated easily toward a direction that is not intended by a user (such as a direction in which a person exists).

As a technology for preventing the projection direction from facing in the direction that is not intended by the user, there has been known a portable electronic device having a projector function disclosed in Japanese Patent Application Laid-Open No. 2009-3281. When this portable electronic device moves a distance more than a predetermined value, the portable electronic device measures the distance to the projection surface. When the measured distance is more than a predetermined distance, the portable electronic device stops or reduces the output of the projector.

SUMMARY OF THE INVENTION

According to an aspect of the present invention, a portable information processing device, including a main body comprising a projector configured to project an image; a state detection unit configured to detect a state of the main body; and an output control unit configured to control an output of the projector based on the state of the main body detected by the state detection unit.

Further features of the present invention will become apparent from the following description of exemplary embodiments with reference to the attached drawings.

DESCRIPTION OF THE EMBODIMENTS

When a projector is built into a portable information processing device, it is preferred that the output of the projector be controlled based on the state of the information processing device. For example, the output of the projector is controlled based on the state of movement of the information processing device (projector). When a user moves the projector in order to change a projection direction, the user moves the projector in a careful manner, and hence there is a low probability that the projection direction faces in a direction that is not intended by the user. In this case, it is preferred to reduce the output of the projector without stopping the output. This is because when the output of the projector is reduced, low-intensity light is output so as to make the projection direction of the projector clear, which facilitates a change of the projection direction. In a case where the information processing device is a mobile phone and the user needs to make a phone call during the projection by the projector, however, the projection direction may face in the direction that is not intended by the user. In this case, it is preferred to stop the output of the projector.

As described above, a degree of probability that the projection direction faces in the direction that is not intended by the user differs depending on the state of the movement of the information processing device (projector), and it is desired to control the output based on this degree. Hitherto, however, the output control taking the state of the movement of the projector into consideration has not been performed, and hence there is an increasing demand for a technology for performing output control in an appropriate manner.

Now, embodiments of the present invention are described in detail with reference to the drawings. Note that, components described in this embodiment are merely exemplary components, and are not intended to limit the scope of the present invention to those components.

<Overall Configuration>

Figure 1A:
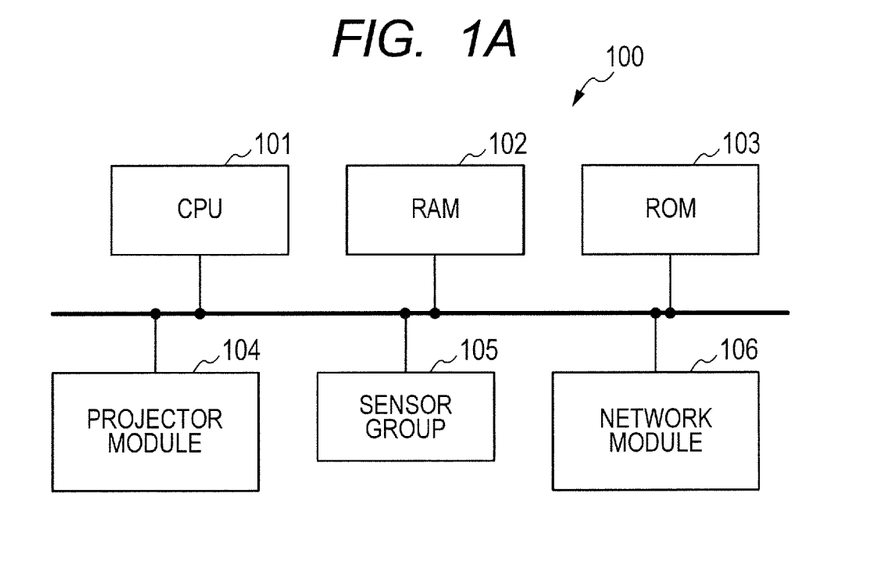
FIG. 1A is a hardware configuration diagram of an information processing device.
Figure 1B:
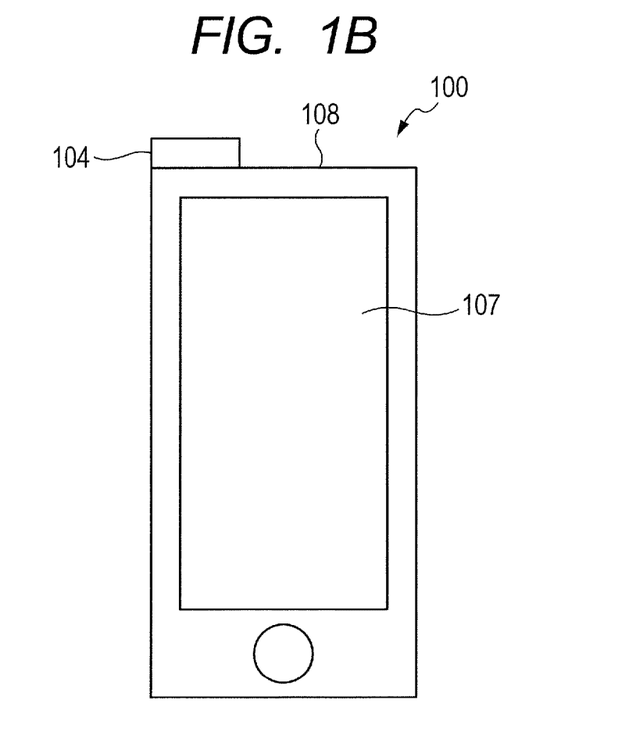
FIG. 1B is an external view of the information processing device.

FIGS. 1A and 1B are configuration diagrams of an information processing device having a projector function according to this embodiment. FIG. 1A illustrates a hardware configuration of the information processing device and FIG. 1B illustrates an external view thereof. This information processing device, which is denoted by 100, is small in size and portable, and is a mobile phone having a projector function, for example. Note that, the information processing device 100 may also be a stationary projector as long as the projector to be used is movable.

The information processing device (portable information processing device) 100 includes a central processing unit (CPU) 101, a random access memory (RAM) 102, and a read only memory (ROM) 103. The CPU 101 reads a computer program stored in the ROM 103 and uses the RAM 102 as a working area to execute the computer program, to thereby control the overall operation of the information processing device 100. In addition to those, the information processing device 100 includes a projector module 104, a sensor group 105, and a network module 106. The operations of those components are controlled by the CPU 101.

The projector module 104 realizes the projector function of the information processing device 100. The projector module 104 is mounted to an upper portion of a main body 108 of the information processing device 100. The sensor group 105 includes an acceleration sensor, a gyro sensor, a magnetic sensor, a distance sensor, a touch sensor 107, and the like, and is configured to detect the behavior and state of the main body 108 of the information processing device 100. The touch sensor 107 is mounted onto, for example, one surface of the main body 108. For example, the touch sensor 107 is mounted on an upper surface of a display of the information processing device 100 so as to form a touch panel and receive the user's touch operation. The network module 106 is a communication interface configured to communicate to and from an external device by telephone, email, or the like.

Figure 2:
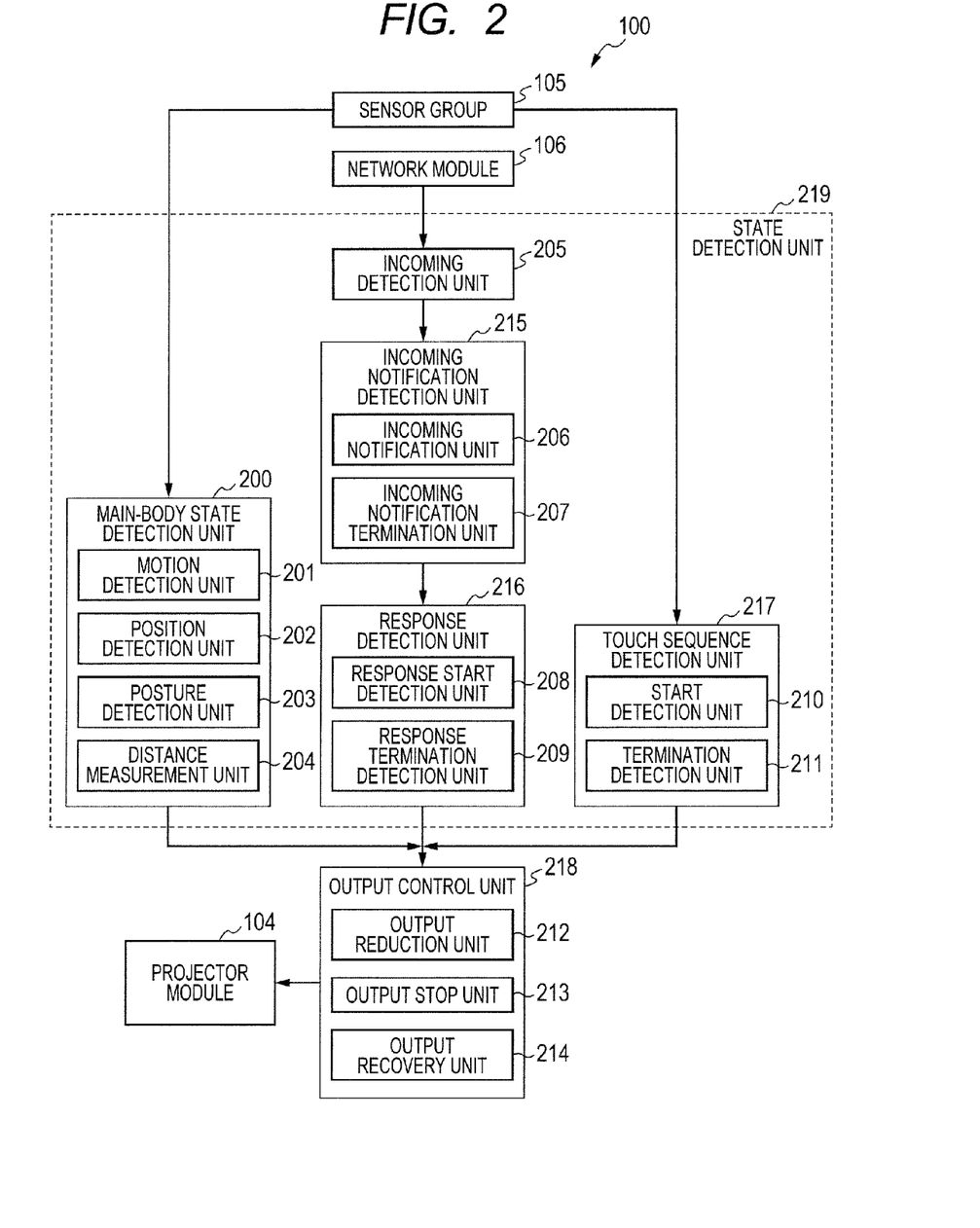
FIG. 2 is a functional block diagram of the information processing device.

FIG. 2 is a functional block diagram illustrating functions implemented in the information processing device 100. The function blocks of FIG. 2 are each implemented by the CPU 101 reading a computer program from the ROM 103 to execute the computer program. In the information processing device 100, a main-body state detection unit 200, an incoming detection unit 205, an incoming notification detection unit 215, a response detection unit 216, a touch sequence detection unit 217, and an output control unit 218 are implemented. Note that, the respective function blocks may be realized as hardware components.

The main-body state detection unit 200 detects the behavior and state of the main body 108 based on detection results acquired by the sensor group 105. To this end, the main-body state detection unit 200 includes a motion detection unit 201, a position detection unit 202, a posture detection unit 203, and a distance measurement unit 204.

The motion detection unit 201 detects, based on the detection results acquired by the acceleration sensor, the gyro sensor, the magnetic sensor, and the like, a motion amount quantitatively indicating the motion of the main body 108. The motion amount is, for example, acceleration or a rotation speed. The motion detection unit 201 detects the motion of the main body 108 based on the motion amount, and determines to which of four states of "Stationary", "Small Motion", "Large Motion", and "In Motion" the state of the main body 108 corresponds.

The motion detection unit 201 determines the state of the main body 108 based on, for example, a predetermined first threshold A1 and a predetermined second threshold A2 (A1<A2) for the acceleration. When the acceleration of the main body 108 is the second threshold A2 or more, the motion detection unit 201 determines the state of the main body 108 as being "Large Motion". When the acceleration of the main body 108 is the first threshold A1 or more and less than the second threshold A2, the motion detection unit 201 determines the state of the main body 108 as being "Small Motion". When the acceleration of the main body 108 is less than the first threshold A1, the motion detection unit 201 determines the state of the main body 108 as being "Stationary". When the acceleration of the main body 108 is the first threshold A1 or more, the motion detection unit 201 determines the state of the main body 108 as being "In Motion".

The motion detection unit 201 can acquire the rotation speed of the main body 108 from the gyro sensor. The motion detection unit 201 determines the state of the main body 108 from the rotation speed through the same processing as the processing of determining the state of the main body 108 from the acceleration.

The position detection unit 202 detects the position of the main body 108 from the detection result acquired by the acceleration sensor. The position detection unit 202 calculates a double integration of the acceleration acquired from the acceleration sensor, to thereby calculate the movement distance of the main body 108. For example, the distance from an origin (0, 0, 0) to a current position (x, y, z) of the main body 108 is the movement distance calculated by the position detection unit 202. Note that, the origin (0, 0, 0) is set by initializing the position of the main body 108.

Figure 3A:
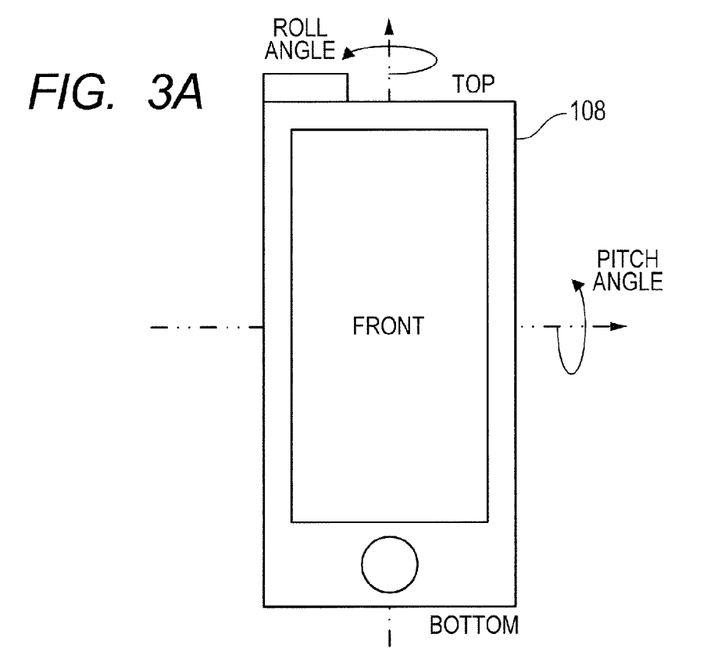
FIG. 3A is an explanatory diagram of a roll angle and a pitch angle.
Figure 3B:
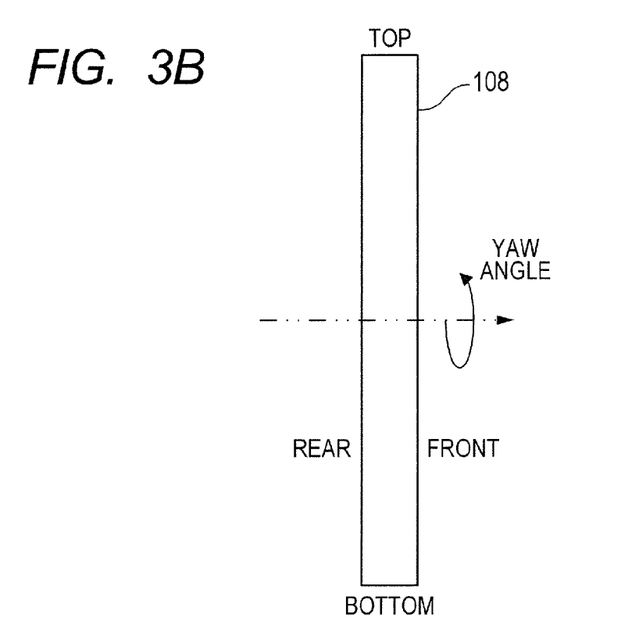
FIG. 3B is an explanatory diagram of a yaw angle.

The posture detection unit 203 detects the posture of the main body 108 through use of Euler angles (roll angle, pitch angle, and yaw angle) of the main body 108. The Euler angles are detected based on the detection result acquired by the gyro sensor, the magnetic sensor, and the like. FIGS. 3A and 3B are explanatory diagrams of the roll angle, the pitch angle, and the yaw angle. A roll angle and a pitch angle that are obtained under a state in which a front surface of the main body 108 faces in a vertical upper direction are each defined as "0°". A yaw angle obtained under a state in which the top of the main body 108 faces in a true north direction is defined as "0°".

The distance measurement unit 204 measures the distance from the main body 108 to a projection surface such as a screen based on the detection result acquired by the distance sensor.

The incoming detection unit 205 receives, via the network module 106, incoming of a message such as a phone call or an e-mail message from an external device (such as a mobile phone) to detect the state of the incoming of the message. The incoming detection unit 205 detects, as the state of the incoming of the message, three states of "Message Incoming", "Receiving Message", and "Incoming of Message Terminated". When there is a new message incoming, the incoming detection unit 205 detects the state "Message Incoming", and then detects the state "Receiving Message". After a lapse of a predetermined period of time, the incoming detection unit 205 detects the state "Incoming of Message Terminated".

The incoming notification detection unit 215 performs incoming processing based on the message received by the incoming detection unit 205. The incoming notification detection unit 215 performs the incoming processing to detect the state of incoming notification, specifically, "Incoming Notification Started", "Notifying Incoming", and "Incoming Notification Terminated". To this end, the incoming notification detection unit 215 includes an incoming notification unit 206 and an incoming notification termination unit 207. The incoming notification unit 206 notifies the user that there is a new message. The incoming notification unit 206 issues a notification to the user through a sound, light emission, vibration, or the like. The incoming notification termination unit 207 terminates the notification to the user issued by the incoming notification unit 206. The incoming notification termination unit 207 terminates the notification of a new message to the user issued through a sound, light emission, vibration, or the like.

The response detection unit 216 detects whether or not the user has terminated a response to the message. The response detection unit 216 detects the state of the user's response, specifically, "Response Started", "Responding", and "Response Terminated". To this end, the response detection unit 216 includes a response start detection unit 208 and a response termination detection unit 209.

The response start detection unit 208 detects that the user performs a response operation on the incoming message to start a response ("Response Started"). In a case where the message is a phone call, the state "Response Started" is detected when the user depresses a call start button. In a case where the message is an e-mail message, the state "Response Started" is detected when the user starts an e-mail application. The depression of the call start button and starting of the e-mail application correspond to the response operation.

When the user starts a response, the response detection unit 216 detects the state "Responding".

The response termination detection unit 209 detects that the user has terminated the response to the message to which the user is currently responding ("Response Terminated"). In a case where the message is a phone call, the state "Response Terminated" is detected when the user depresses a call termination button. In a case where the message is an e-mail message, the state "Response Terminated" is detected when the user closes the e-mail application.

The touch sequence detection unit 217 includes a start detection unit 210 and a termination detection unit 211. The touch sequence is formed of a sequence of touch operations performed from when the finger touches the touch sensor 107 to when the finger is separated from the touch sensor 107. Gestures such as pinching and flicking are recognized through the touch sequence. The start detection unit 210 detects the start of the touch sequence when the finger touches the touch sensor 107. The termination detection unit 211 detects the termination of the touch sequence when the finger is separated from the touch sensor 107.

The main-body state detection unit 200, the incoming detection unit 205, the incoming notification detection unit 215, the response detection unit 216, and the touch sequence detection unit 217 that are described above form a state detection unit 219 configure to detect the state of the main body 108 of the information processing device 100.

The output control unit 218 controls, based on the state of the main body 108 of the information processing device 100 detected by the state detection unit 219, the operation of the projector module 104 to adjust a quantity of light to be output. The output control unit 218 includes an output reduction unit 212, an output stop unit 213, and an output recovery unit 214.

The output reduction unit 212 reduces the output of the projector module 104 based on the detection result acquired by the state detection unit 219. For example, the output reduction unit 212 reduces the quantity of light being output from a normal value. The output reduction unit 212 reduces the output of the projector module 104 when, as a result of the detection by the state detection unit 219, a projection direction of the projector module 104 (direction of light to be output) may face in a direction that is not intended by the user.

The output stop unit 213 stops the output of the projector module 104 based on the detection result acquired by the state detection unit 219. The output stop unit 213 stops the output of the projector module 104 when, as a result of the detection by the state detection unit 219, there is a high probability that the projection direction of the projector module 104 faces in the direction that is not intended by the user.

The output recovery unit 214 brings the output of the projector module 104 back to the normal value based on the detection result acquired by the state detection unit 219. The output recovery unit 214 brings the output of the projector module 104 back to the normal value when, as a result of the detection by the state detection unit 219, there is no possibility that the projection direction of the projector module 104 faces in the direction that is not intended by the user, and restarts the normal projection.

The information processing device 100 configured as described above executes processing to be described in the following embodiments, to thereby control the output of the projector module 104.

Figure 4:
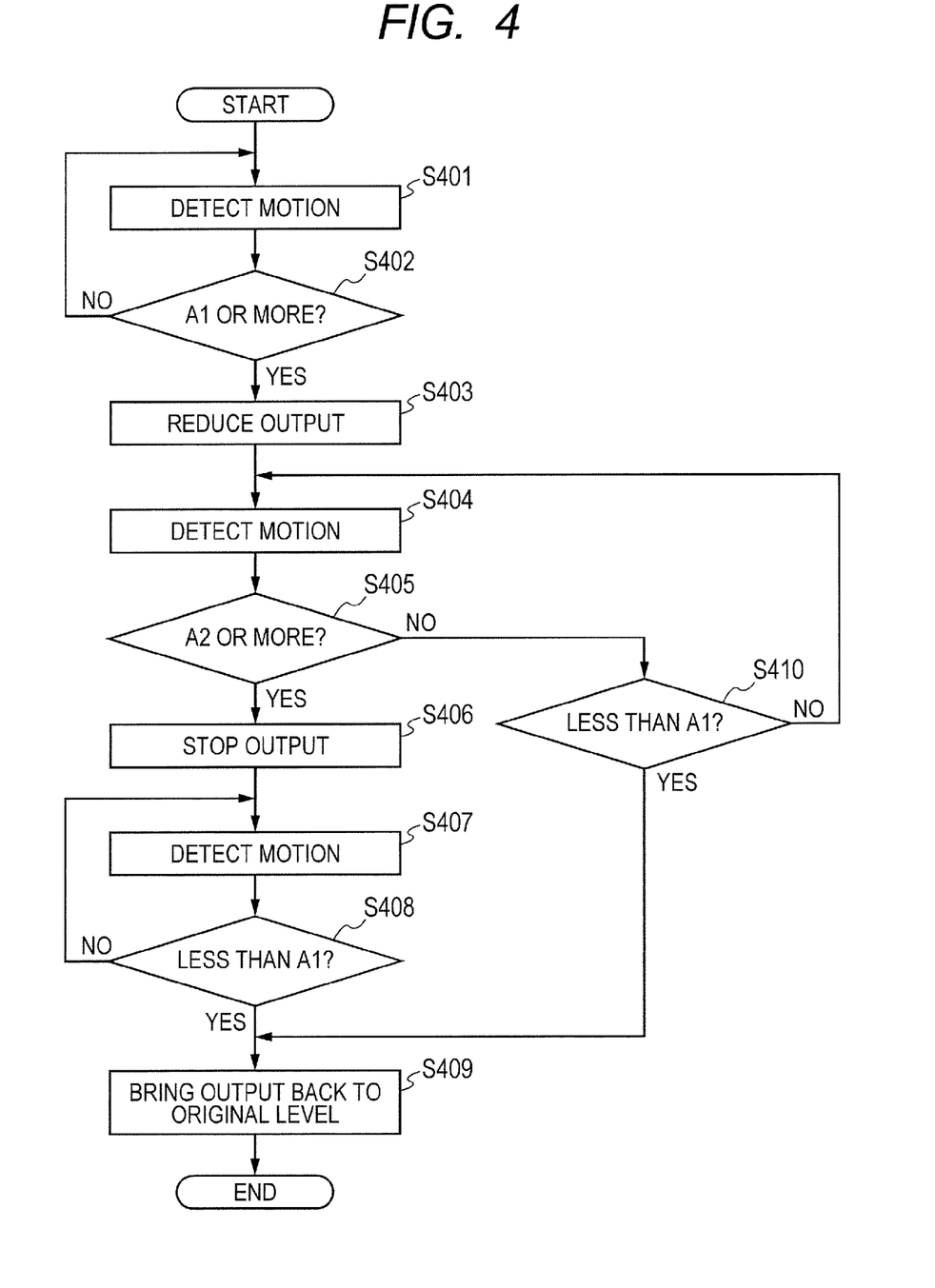
FIG. 4 is a flow chart illustrating output control processing for a projector.

As a first embodiment of the present invention, an example is described in which the output of the projector module 104 is controlled based on the motion amount, which is indicated by the acceleration applied to the main body of the information processing device 100. In a case of adjusting the projection direction while using the projector function of the information processing device 100, the user moves the main body 108 of the information processing device 100, and changes the posture of the main body 108 at the same time. FIG. 4 is a flow chart illustrating output control processing for the projector module 104 at the time of such adjustment of the projection direction.

The information processing device 100 controls the motion detection unit 201 to detect the motion of the main body 108 (S401). The motion of the main body 108 is generated when the user moves the main body 108 to change the posture thereof, and is detected by the sensor group 105. The motion detection unit 201 detects the motion of the main body 108 as the acceleration or the rotation speed. Now, an example is described in which the motion detection unit 201 detects the motion of the main body 108 as the acceleration.

The output control unit 218 determines, based on the detection result acquired by the motion detection unit 201, whether or not the projection direction of the projector module 104 may face in the direction that is not intended by the user. To this end, the motion detection unit 201 confirms whether or not the detected acceleration of the main body 108 is the first threshold A1 or more (S402). To adjust the projection direction of the projector module 104, in many cases, the user moves the main body 108 at low speed so that those around the user are not irradiated with the light. Note that, even when the main body 108 moves at low speed, the projection direction may face in the direction that is not intended by the user due to, for example, a change of a surrounding environment. However, if the output of the light is stopped when the main body 108 is moved at low speed, operability for adjusting the projection direction decreases. Thus, in this embodiment, while utilizing the advantages of the portable information processing device 100, that is, while enabling the user to manually adjust the projection direction with ease, the influence of light on surroundings due to the projection of the light in the direction that is not intended by the user, which is caused by an extra force or the like, is reduced. Thus, in the first embodiment, when the main body is detected to be in a state in which this main body is likely to be moved greatly from then on based on an actual motion amount applied to the main body, the output of the projector is reduced. To this end, in this embodiment, when the acceleration is less than the first threshold A1 (S402: NO), the output control unit 218 does not change the output of the projector module 104. The motion detection unit 201 detects the motion of the main body 108 from then on.

When the acceleration of the main body 108 is the first threshold A1 or more (S402: YES), the output control unit 218 determines that the projection direction of the projector module 104 may face in the direction that is not intended by the user. In this case, the output control unit 218 controls the output reduction unit 212 to reduce the output of the projector module 104, to thereby reduce the quantity of light (S403).

After the output of the projector module 104 is reduced, the information processing device 100 controls the motion detection unit 201 to detect the motion of the main body 108 again (S404). The output control unit 218 confirms again, based on the detection result acquired by the motion detection unit 201, whether or not the projection direction of the projector module 104 may face in the direction that is not intended by the user. To this end, the motion detection unit 201 confirms whether or not the detected acceleration of the main body 108 is the second threshold A2 or more (S405). Although the output of the projector module 104 is reduced through the processing of Step S403, the projection of an image is continued and the user can therefore adjust the projection direction while seeing the projected image. For example, when there occurs a sudden motion of the projector module 104, for example, when the user slips while adjusting the projection direction, the projection direction may change abruptly. An abrupt change of the projection direction increases the probability that the projection direction of the projector module 104 faces in the direction that is not intended by the user. When the projection direction changes abruptly, the acceleration and rotation speed of the main body 108 increase. Accordingly, the second threshold A2 is set to a value more than the first threshold A1 in order to detect an abrupt change of the projection direction.

When the acceleration of the main body 108 is the second threshold A2 or more (S405: YES), the output control unit 218 determines that there is a high probability that the projection direction of the projector module 104 faces in the direction that is not intended by the user. In this case, the output control unit 218 controls the output stop unit 213 to stop the output of the projector module 104, to thereby bring the quantity of light to zero (S406). After stopping the output, the information processing device 100 controls the motion detection unit 201 to detect the motion of the main body 108 again (S407). The motion detection unit 201 repeatedly detects the motion of the main body 108 until the detected acceleration of the main body 108 becomes less than the first threshold A1 (S408). The output is stopped during this repetition, and hence the light is never projected in the direction that is not intended by the user. When the acceleration of the main body 108 becomes less than the first threshold A1 (S408: YES), the output control unit 218 controls the output recovery unit 214 to bring the output of the projector module 104 back to an original level, to thereby set the quantity of light to a normal level (S409). When the acceleration of the main body 108 becomes less than the first threshold A1, the information processing device 100 determines that the user has finished adjusting the projection direction and put the main body 108 to a new position. Thus, the information processing device 100 brings the output of the projector module 104 back to the original level and restarts the normal projection.

When the acceleration of the main body 108 is less than the second threshold A2 (S405: NO), the motion detection unit 201 confirms whether or not the acceleration of the main body 108 detected in Step S404 is less than the first threshold A1 (S410). When the acceleration of the main body 108 is the first threshold A1 or more (S410: NO), the processing returns to Step S404, and the motion detection unit 201 detects the motion of the main body 108 again. The motion detection unit 201 repeatedly detects the motion of the main body 108 until the detected acceleration of the main body 108 becomes less than the first threshold A1. The output is reduced during this repetition, and hence even when the light is projected in the direction that is not intended by the user, the projected light less affects those around the user. When the acceleration of the main body 108 becomes less than the first threshold A1 (S410: YES), the output control unit 218 controls the output recovery unit 214 to bring the output of the projector module 104 back to the original level, to thereby set the quantity of light to the normal level (S409).

The motion of the main body 108 of the information processing device 100 is detected in this manner, and the quantity of light to be projected is adjusted based on the state of the detected motion. With this, when the user moves the main body 108, it is possible to prevent the light from being projected in the direction that is not intended by the user to affect those around the user.

Figure 5:
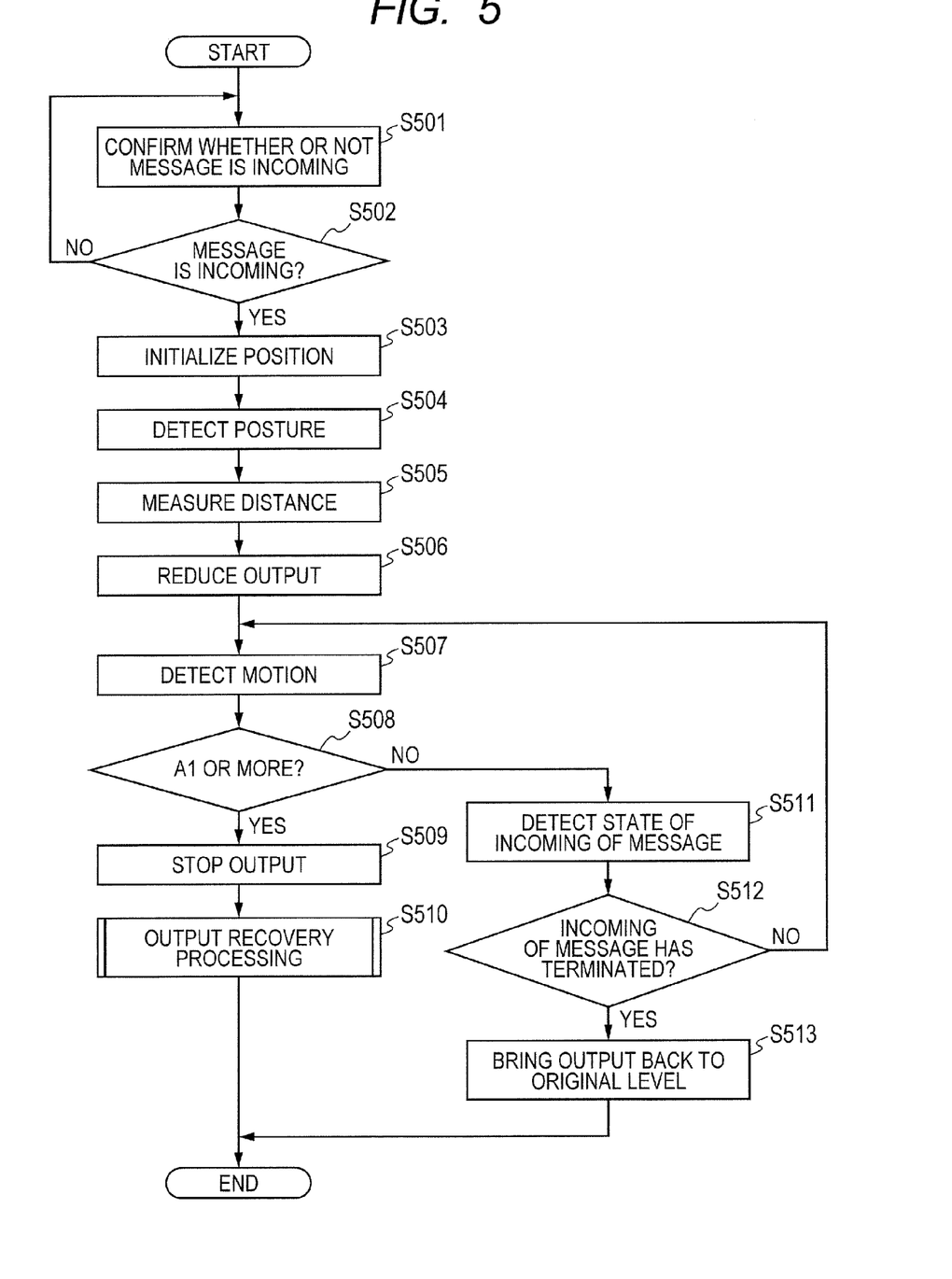
FIG. 5 is a flow chart illustrating output control processing for the projector.

As a second embodiment of the present invention, an example is described in which when a new message is incoming during the use of the projector function, it is assumed that the main body is in the state in which this main body is likely to be moved greatly and the output of the projector is then reduced. When a new message is incoming during the use of the projector function, the user is to move the main body 108 of the information processing device 100 in order to respond to the message. FIG. 5 is a flow chart illustrating output control processing for the projector module 104 at the time of such incoming of the message.

The information processing device 100 controls the incoming detection unit 205 to detect whether or not a new message is incoming to the network module 106 while the projector module 104 projects the image (S501). When the message is incoming (S502: YES), the position detection unit 202 initializes the position of the main body 108 at this time to the origin (0, 0, 0) (S503). After the initialization, the information processing device 100 controls the posture detection unit 203 to detect a posture (R0, Y0, P0) of the main body 108 at this time through use of the Euler angles (S504). Further, the distance measurement unit 204 measures the distance from the main body 108 to the projection surface at this time (S505). A measurement value acquired in this step is represented by "d0". The initialized position, the detected posture of the main body 108, and the measurement value of the distance "d0" are saved to the RAM 102.

When a new message is incoming, the user is to move the main body 108. For example, in a case where a phone call is incoming, the user brings the main body 108 close to his/her ear in order to answer the call. When the user brings the main body 108 close to his/her ear, the projection direction may face in the direction that is not intended by the user. At the time when the message is incoming, it cannot be known whether or not the user immediately responds to the message by moving the main body. Thus, the output control unit 218 controls the output reduction unit 212 to reduce the output of the projector module 104, to thereby reduce the quantity of light (S506).

After having reduced the output of the projector module 104, the information processing device 100 controls the motion detection unit 201 to detect the motion of the main body 108 (S507). Processing of detecting the motion of the main body 108 is the same as that of the first embodiment (see S401 of FIG. 4). The output control unit 218 confirms, based on the detection result acquired by the motion detection unit 201, whether or not the projection direction of the projector module 104 may face in the direction that is not intended by the user. To this end, the motion detection unit 201 confirms whether or not the detected acceleration of the main body 108 is the first threshold A1 or more (S508).

When the acceleration of the main body 108 is the first threshold A1 or more (S508: YES), the output control unit 218 determines that there is a high probability that the projection direction of the projector module 104 faces in the direction that is not intended by the user. In this case, the output control unit 218 controls the output stop unit 213 to stop the output of the projector module 104, to thereby bring the quantity of light to zero (S509). When the acceleration of the main body 108 is the first threshold A1 or more, it is estimated that the user responds to the message. When the user's response is terminated, the information processing device 100 performs output recovery processing to be described later to bring the output of the projector module 104 back to the original level, and then terminates the processing (S510).

When the acceleration of the main body 108 is less than the first threshold A1 (S508: NO), the incoming detection unit 205 detects the state of incoming of the message (S511). When the incoming detection unit 205 detects the termination of the incoming of the message (S512: YES), the output control unit 218 controls the output recovery unit 214 to bring the output of the projector module 104 back to the original level, to thereby set the quantity of light to the normal level (S513). When the incoming detection unit 205 does not detect the termination of the incoming of the message (S512: NO), the information processing device 100 repeats the processing of Step S507 and the subsequent steps.

As described above, when a new message is incoming during the use of the projector function, the information processing device 100 reduces the quantity of light to be projected, and when the user responds to this message, brings the quantity of light to zero. With this, it is possible to prevent the light from affecting those around the user due to the projection of the light in the unintended direction, which is caused by the user moving the main body 108 in response to the incoming of the message.

Figure 6:
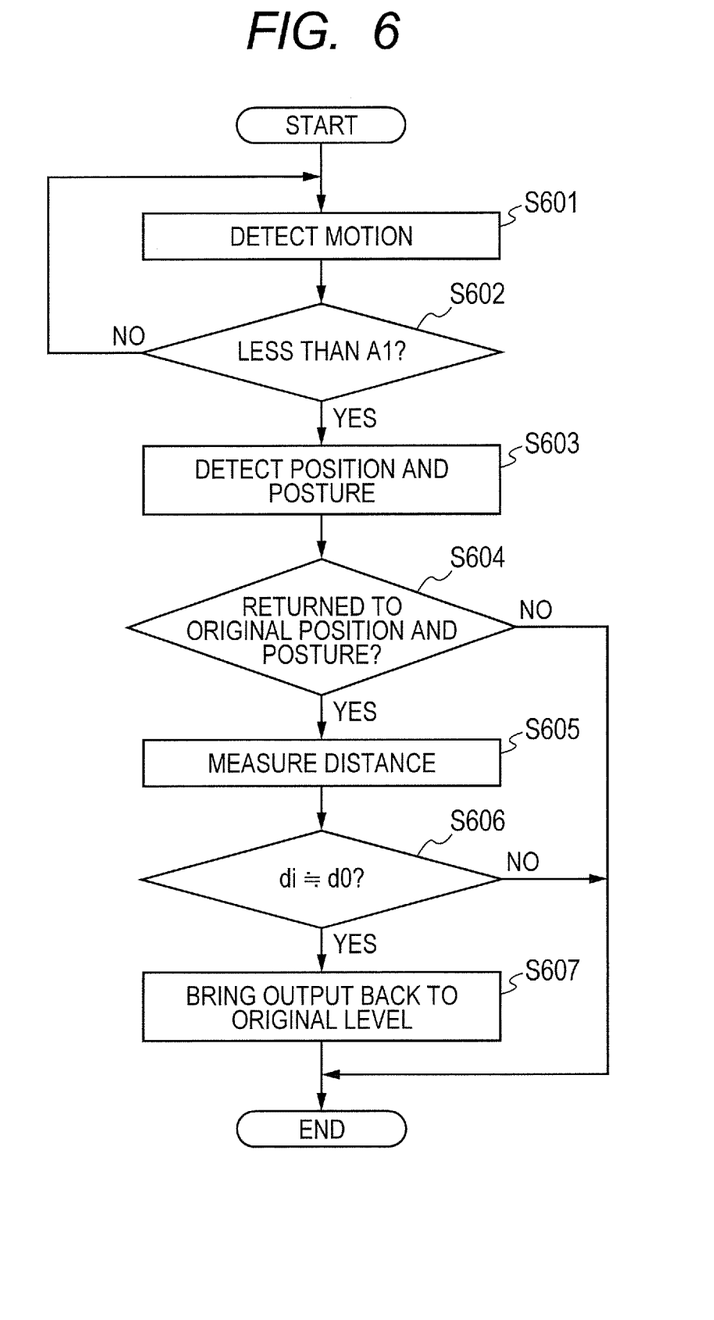
FIG. 6 is a flow chart illustrating output recovery processing.

FIG. 6 is a flow chart illustrating the output recovery processing of Step S510.

When the output recovery processing is started, the information processing device 100 controls the motion detection unit 201 to detect the motion of the main body 108 (S601). Processing of detecting the motion of the main body is the same as that of the first embodiment (see S401 of FIG. 4). The output control unit 218 confirms, based on the detection result acquired by the motion detection unit 201, whether or not the projection direction of the projector module 104 may face in the direction that is not intended by the user. To this end, the motion detection unit 201 confirms whether or not the detected acceleration of the main body 108 is less than the first threshold A1 (S602). When the acceleration of the main body 108 is the first threshold A1 or more (S602: NO), the output control unit 218 determines that the projection direction of the projector module 104 may face in the direction that is not intended by the user. In this case, the information processing device 100 cannot perform the output recovery processing, and hence the information processing device 100 controls the motion detection unit 201 to detect the motion of the main body 108 again.

When the acceleration of the main body 108 is less than the first threshold A1 (S602: YES), the position detection unit 202 detects a position (x1, y1, z1) of the main body 108 at this time. Further, the posture detection unit 203 detects a posture (R1, P1, Y1) of the main body 108 through use of the Euler angles (S603).

The output recovery unit 214 of the output control unit 218 determines, based on the position (x1, y1, z1) and posture (R1, P1, Y1) of the main body 108, whether or not the main body 108 has returned to its original position at the time of the incoming of the message (S604). The output recovery unit 214 compares the position (x1, y1, z1) and posture (R1, P1, Y1) of the main body 108 that are detected in Step S603 with the position (0, 0, 0) and posture (R0, P0, Y0) of the main body 108 that are detected in Steps S503 and S504 of FIG. 5. When the position and posture of the main body 108 are the same as before as a result of the comparison, the output recovery unit 214 determines that the main body 108 has returned to its original position (S604: YES). Note that, there is a variation in precision among the sensor group 105 configured to detect the position, posture, and the like of the main body 108. For this reason, in the case of comparison of the position and posture of the main body 108, a case where the positions and postures are "the same" includes a case where the positions and postures are substantially the same within a range determined in consideration of the precisions of the sensor group 105. When the main body 108 has not returned to its original position (S604: NO), the output recovery processing is terminated.

When the main body 108 has returned to its original position, the distance measurement unit 204 measures a distance d1 from the main body 108 to the projection surface (S605). The output recovery unit 214 compares the distance d1 with the distance d0 measured in Step S505 of FIG. 5 (S606). In this manner, the information processing device 100 confirms whether or not the relationship between the main body 108 and the projection surface has returned to the original one at the time of the incoming of the message. When the distance d1 is the same as the distance d0 (S606: YES), the output recovery unit 214 determines that the relationship between the main body 108 and the projection surface has returned to the original one, and brings the output of the projector module 104 back to the original level, to thereby set the quantity of light to the normal level (S607). In the case of comparison between the distance d1 and the distance d0, as in the case of the comparison of the position and the posture, a case where the distances are "the same" also includes a case where the distances are substantially the same within a range determined in consideration of the precisions of the sensor group 105. When the distance d1 is not the same as the distance d0 (S606: NO), the output recovery unit 214 determines that the relationship between the main body 108 and the projection surface has not returned to the original one, and the output recovery processing is terminated.

When the user has terminated the response to the message, the user returns the main body 108 to its original position and posture. As a result of the return to the original position and posture, there is a low probability that a person exists in the projection direction of the projector module 104. Thus, it can be determined that after the main body 108 is returned to its original position and posture, there is no longer a possibility that the projection direction of the projector module 104 faces in the direction that is not intended by the user. Further, when the light is projected onto a movable projection surface such as a screen, the projection surface may move while the user is responding to the message. In order to confirm whether or not the screen is moved, the distance d1 from the main body 108 to the projection surface is measured so as to be compared with the original distance d0. In this manner, when it is confirmed that the main body 108 has returned to its original state before the user responds to the message, the information processing device 100 brings the output of the projector module 104 back to the original level.

Figure 7:
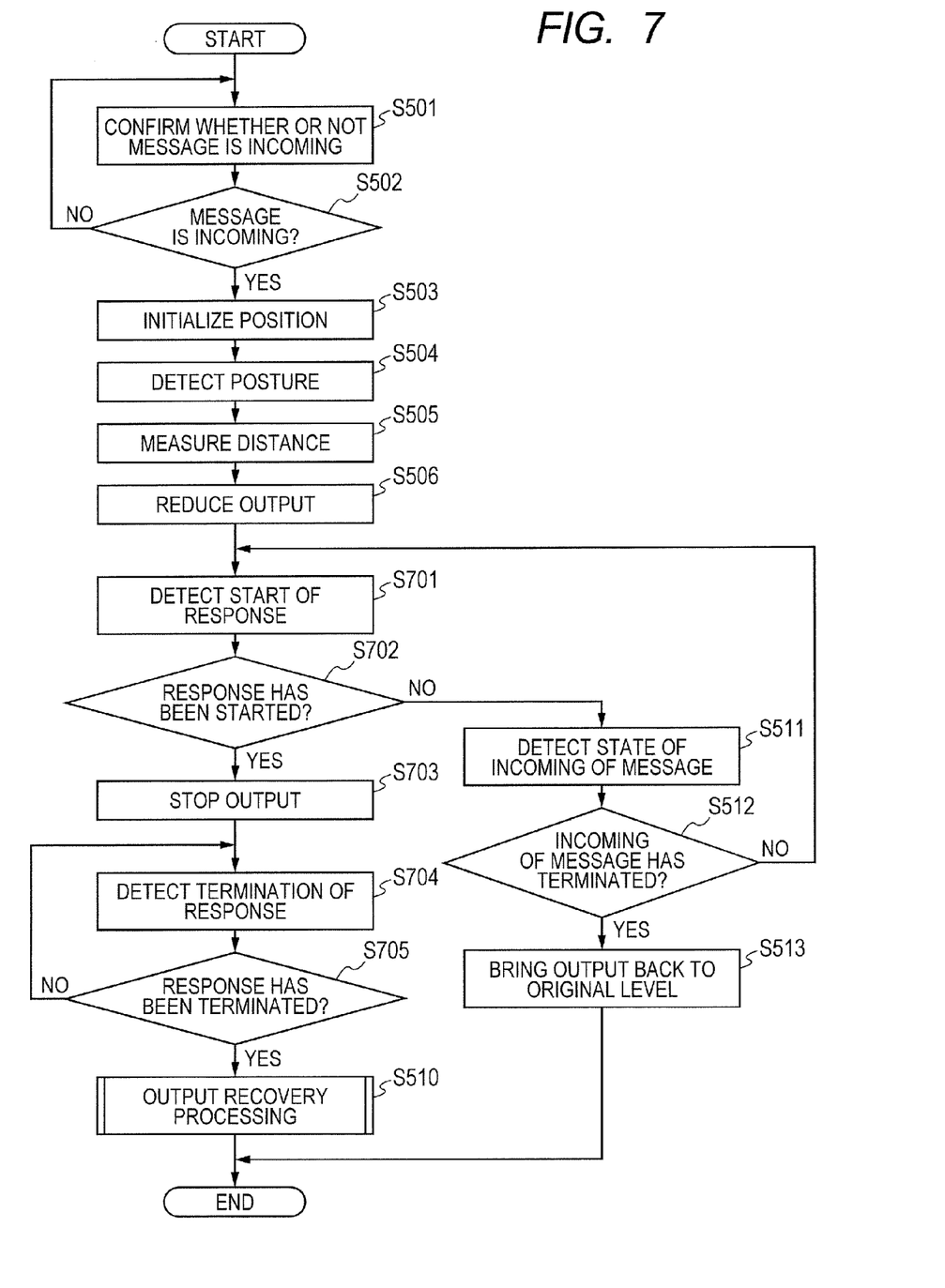
FIG. 7 is a flow chart illustrating output control processing for the projector.

In the second embodiment, the output of the projector module 104 is controlled by detecting the motion of the main body 108 when a new message is incoming. In contrast, as a third embodiment of the present invention, an example is described in which whether or not the user has responded to the incoming after the incoming is detected, and in this manner, it is determined with more accuracy that the main body is in the state in which this main body is likely to be moved greatly so as to control the output of the projector module 104. FIG. 7 is a flow chart illustrating such output control processing for the projector module 104.

Processing from the confirmation of the incoming to the reduction of the output of the projector module 104 is the same as that of the second embodiment, and hence a description thereof is omitted (S501 to S506). After the output of the projector module 104 is reduced, the response detection unit 216 controls the response start detection unit 208 to detect whether or not the user has started the response to the incoming message (S701). The response start detection unit 208 detects the start of response by, for example, confirming the user's depression of the call start button or the like.

When the user has started the response (S702: YES), the output control unit 218 controls the output stop unit 213 to stop the output of the projector module 104, to thereby bring the quantity of light to zero (S703). When the user has started the response, it is definite that the user moves the main body 108, which increases the probability that the projection direction faces in the direction that is not intended by the user. The output control unit 218 therefore stops the output of the projector module 104.

The response termination detection unit 209 detects the user's termination of the response (S704, S705: YES). The output control unit 218 performs the output recovery processing in response to the termination of the response (S510), and terminates the processing. Note that, when the user does not start the response (S702: NO), the information processing device 100 performs the same processing as that of Steps S511 to S513 of the second embodiment, and terminates the processing.

As described above, when a new message is incoming during the use of the projector function, the information processing device 100 reduces the quantity of light to be projected, and when the user responds to this message, brings the quantity of light to zero. With this, it is possible to prevent the light from affecting those around the user due to the projection of the light in the unintended direction, which is caused by the user moving the main body 108 in response to the incoming of the message.

Figure 8:
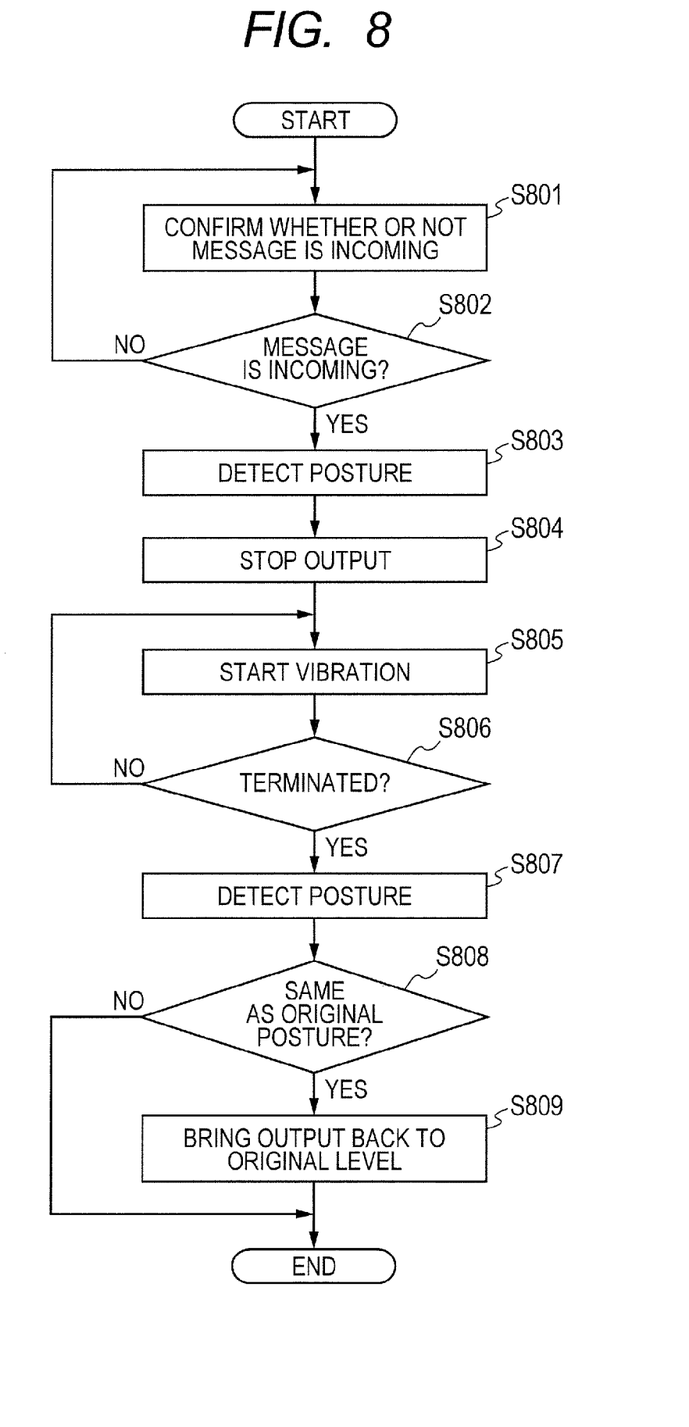
FIG. 8 is a flow chart illustrating output control processing for the projector.

As a fourth embodiment of the present invention, an example is described in which when such setting is made that a vibration function among others is used as a method of issuing a notification of incoming of a new message, it is assumed that the main body is in the state in which this main body is likely to be moved greatly and the output of the projector is then reduced. In particular, in this embodiment, the output control for the projector is started by the time the information processing device 100 starts vibrating due to the vibration function. FIG. 8 is a flow chart illustrating the output control processing for the projector module 104 when the user is notified of the incoming of the new message through the vibration function.

The information processing device 100 controls the incoming detection unit 205 to detect whether or not a new message is incoming to the network module 106 while the projector module 104 projects an image (S801). When the message is incoming (S802: YES), the posture detection unit 203 detects a posture (R0, Y0, P0) of the main body 108 at this time through use of the Euler angles (S803). The detected posture of the main body 108 is saved to the RAM 102.

After the detection of the posture of the main body 108, the output control unit 218 controls the output stop unit 213 to stop the output of the projector module 104, to thereby bring the quantity of light to zero (S804). After stopping the output of the projector module 104, the information processing device 100 notifies the user of the incoming of the message through the vibration function (S805). The notification through the vibration terminates when the user stops the vibration or after the lapse of a predetermined period of time (S806: YES). When the vibration is started, there is a high probability that the main body 108 vibrates and the posture and projection direction are changed consequently, which increases the probability that the projection direction faces in the direction that is not intended by the user. The output of the projector module 104 is therefore stopped before the vibration is started.

After the stop of the vibration, the posture detection unit 203 detects the posture (R1, Y1, P1) of the main body 108 at this time (S807). The output recovery unit 214 compares the posture of the main body 108 before the vibration with that after the vibration, and when those postures are the same (S808: YES), the information processing device 100 brings the output of the projector module 104 back to the original level, and then terminates the processing (S809). When those postures are different from each other (S808: NO), the information processing device 100 terminates the processing without bringing the output of the projector module 104 back to the original level.

When the posture of the main body 108 is the same as before the vibration even after the termination of the vibration, it can be estimated that the projection direction is not changed and thus there is no longer a possibility that the projection direction of the projector module 104 faces in the direction that is not intended by the user. The information processing device 100 therefore brings the output of the projector module 104 back to the original level and restarts the projection.

As described above, when the incoming of the message is notified through the vibration, by bringing the quantity of light to zero, the information processing device 100 can prevent the light from being projected in the direction that is not intended by the user to affect those around the user.

Figure 9:
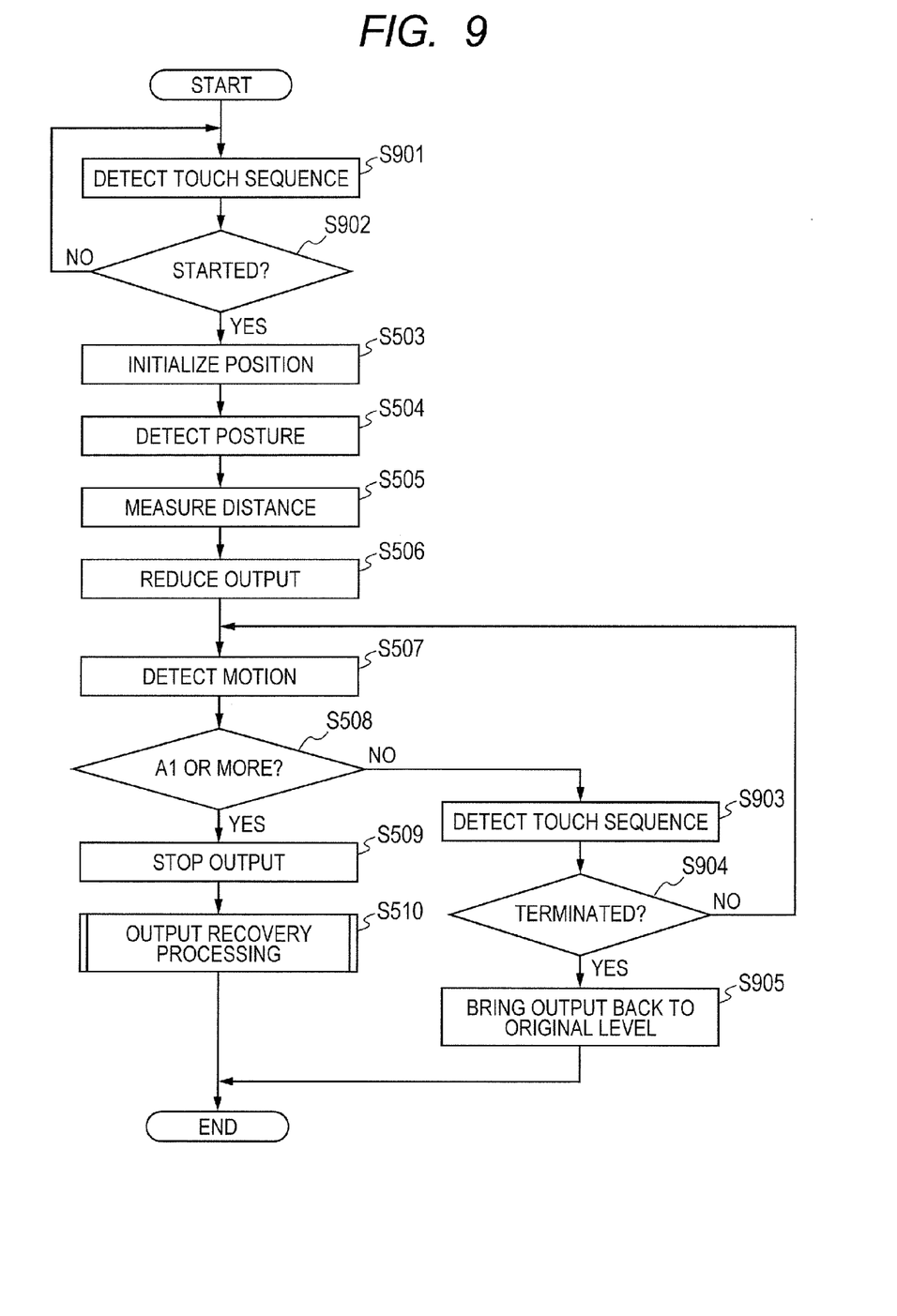
FIG. 9 is a flow chart illustrating output control processing for the projector.

As a fifth embodiment of the present invention, an example is described in which, in consideration of a possibility that the device main body is shaken due to the touch operation on the information processing device 100, it is determined whether or not the main body is in the state in which this main body is likely to be moved greatly and the output of the projector module 104 is then controlled. FIG. 9 is a flow chart illustrating the output control processing for the projector module 104 at the time when the user performs a touch operation on the touch sensor 107 during the use of the projector function.

When the touch operation is performed on the touch sensor 107 during the projection by the projector module 104, the information processing device 100 controls the start detection unit 210 of the touch sequence detection unit 217 to detect the start of the touch sequence (S901, S902: YES). After detecting the start of the touch sequence, the information processing device 100 controls the output of the projector module 104 through the processing of Step S503 and subsequent steps of FIG. 9.

The touch sensor 107 is mounted onto the main body 108. Accordingly, when the user performs the touch operation on the touch sensor 107, the main body 108 may move and the projection direction may be changed consequently. The output control unit 218 therefore predicts that there arises a possibility that the projection surface faces in the unintended direction, and then controls the output of the projector module 104.

Note that, when the motion of the main body 108 is less than the first threshold A1 in Step S508 (S508: NO), the touch sequence detection unit 217 controls the termination detection unit 211 to detect the termination of the touch sequence (S903, S904: YES). When the touch sequence is terminated, the output recovery unit 214 brings the output of the projector module 104 back to the original level, and terminates the processing (S905).

As described above, even when the touch operation is performed, by controlling the quantity of light to be projected, the information processing device 100 can prevent the light from being projected in the direction that is not intended by the user to affect those around the user.

Note that, each of the first to fifth embodiments described above may be one of such operation modes that the user can select at least one from among those operation modes for use in one information processing device 100. Alternatively, the first to fifth embodiments may be unique functions respectively operating on the independent information processing devices 100.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-063733, filed Mar. 26, 2014 which is hereby incorporated by reference wherein in its entirety.

What is claimed is:

1. A portable information processing device comprising:
   (a) a main body comprising a projector configured to project an image;
   (b) a state detection unit configured to detect a state of the main body; and
   (c) an output control unit configured to control an output of the projector based on the state of the main body detected by the state detection unit,
   wherein the state detection unit detects a motion amount quantitatively indicating a motion of the main body,
   wherein the output control unit controls the output of the projector based on the motion amount detected by the state detection unit, and
   wherein the output control unit (1) reduces the output of the projector when the motion amount detected by the state detection unit is a predetermined first threshold or more, and is less than a second threshold, which is more than the predetermined first threshold, and (2) stops the output of the projector when the motion amount is the second threshold or more.

2. The portable information processing device according to claim 1, wherein the output control unit reduces the output of the projector when the state of the main body detected by the state detection unit is a state in which the main body is likely to be moved greatly.

3. The portable information processing device according to claim 1, wherein the output control unit brings the output of the projector back to an original level when the motion amount becomes less than the predetermined first threshold after the output control unit performs one of the reduction and the stopping of the output of the projector.

4. The portable information processing device according to claim 1, wherein the portable information processing device includes a mobile phone having a projector function.

5. A portable information processing device comprising:
   (a) a main body comprising a projector configured to project an image;
   (b) a state detection unit configured to detect a state of the main body; and
   (c) an output control unit configured to control an output of the projector based on the state of the main body detected by the state detection unit,
   wherein the main body further comprises a communication interface configured to communicate to and from an external device,
   wherein the state detection unit detects incoming of a message to the communication interface from the external device,
   wherein the output control unit reduces the output of the projector when the state detection unit detects the incoming of the message,
   wherein the state detection unit detects a motion amount quantitatively indicating a motion of the main body after the output of the projector is reduced, and
   wherein the output control unit stops the output of the projector when the motion amount detected by the state detection unit is a predetermined first threshold or more.

6. The portable information processing device according to claim 5, wherein, when detecting the incoming of the message, the state detection unit (a) saves to a predetermined storing unit a position of the main body, a posture of the main body, and a distance from a projection surface to the main body, and (b) after the output of the projector is stopped, detects a position of the main body, a posture of the main body, and a distance from the projection surface to the main body, and
   wherein the output control unit brings the output of the projector back to an original level when the position, the posture, and the distance that are detected after the output of the projector is stopped are the same as the position, the posture, and the distance that are saved to the predetermined storing unit.

7. A portable information processing device comprising:
(a) a main body comprising a projector configured to project an image;
(b) a state detection unit configured to detect a state of the main body; and
(c) an output control unit configured to control an output of the projector based on the state of the main body detected by the state detection unit,
wherein the main body further comprises a communication interface configured to communicate to and from an external device,
wherein the state detection unit detects incoming of a message to the communication interface from the external device,
wherein the output control unit reduces the output of the projector when the state detection unit detects the incoming of the message,
wherein the state detection unit detects a response operation of a user on the incoming of the message, and
wherein the output control unit stops the output of the projector when the state detection unit detects the response operation.

8. The portable information processing device according to claim 7, wherein, when detecting the incoming of the message, the state detection unit (a) saves to a predetermined storing unit a position of the main body, a posture of the main body, and a distance from a projection surface to the main body, and (b) after the output of the projector is stopped, detects a position of the main body, a posture of the main body, and a distance from the projection surface to the main body, and
wherein the output control unit brings the output of the projector back to an original level when the position, the posture, and the distance that are detected after the output of the projector is stopped are the same as the position, the posture, and the distance that are saved to the predetermined storing unit.

9. A portable information processing device comprising:
(a) a main body comprising a projector configured to project an image;
(b) a state detection unit configured to detect a state of the main body; and
(c) an output control unit configured to control an output of the projector based on the state of the main body detected by the state detection unit,
wherein the main body further comprises a communication interface configured to communicate to and from an external device,
wherein the state detection unit detects incoming of a message to the communication interface from the external device,
wherein the output control unit reduces the output of the projector when the state detection unit detects the incoming of the message,
wherein the main body further comprises an incoming notification unit configured to vibrate the main body in response to the incoming of the message, and
wherein the output control unit stops the output of the projector when the incoming notification unit vibrates the main body in response to the incoming of the message.

10. The portable information processing device according to claim 9, wherein the state detection unit saves to a predetermined storing unit a posture of the main body that is detected before the incoming notification unit vibrates the main body, and detects a posture of the main body after the output of the projector is stopped, and wherein the output control unit brings the output of the projector back to an original level when the posture that is detected after the output of the projector is stopped is the same as the posture that is saved to the predetermined storing unit.

11. A portable information processing device comprising:
(a) a main body comprising a projector configured to project an image;
(b) a state detection unit configured to detect a state of the main body; and
(c) an output control unit configured to control an output of the projector based on the state of the main body detected by the state detection unit,
wherein the main body further comprises a touch sensor configured to receive a touch operation of a user,
wherein the state detection unit detects that the touch operation is performed on the touch sensor,
wherein the output control unit reduces the output of the projector when the state detection unit detects that the touch operation is performed, and
wherein the output control unit stops the output of the projector when a motion amount detected by the state detection unit is a predetermined first threshold or more.

12. The portable information processing device according to claim 11, wherein, when detecting that the touch operation is performed on the touch sensor, the state detection unit (a) saves to a predetermined storing unit a position of the main body, a posture of the main body, and a distance from a projection surface to the main body, and (b) after the output of the projector is stopped, detects a position of the main body, a posture of the main body, and a distance from the projection surface to the main body, and
wherein the output control unit brings the output of the projector back to an original level when the position, the posture, and the distance that are detected after the output of the projector is stopped are the same as the position, the posture, and the distance that are saved to the predetermined storing unit.

13. An output control method for a projector, which is to be executed by a portable information processing device comprising a projector configured to project an image, the output control method comprising:
detecting a state of the portable information processing device, and
controlling an output of the projector based on the state of the information processing device
wherein, in the detecting step, a motion amount quantitatively indicating a motion of the main body is detected,
wherein, in the controlling step, the output of the projector is controlled based on the motion amount detected in the detecting step, and
wherein, in the controlling step, (1) the output of the projector is reduced when the motion amount detected in the detecting step is a predetermined first threshold or more and is less than a second threshold, which is more than the predetermined first threshold, and (2) the output of the projector is stopped when the motion amount is the second threshold or more.

14. A non-transitory computer-readable recording medium having recorded thereon a computer program for causing a computer to function as units comprising:
(a) a state detection unit configured to detect a state of a main body of a portable information processing device comprising a projector configured to project an image; and (b) an output control unit configured to control an output of the projector based on the state of the main body detected by the state detection unit,
wherein the state detection unit detects a motion amount quantitatively indicating a motion of the main body,
wherein the output control unit controls the output of the projector based on the motion amount detected by the state detection unit, and
wherein the output control unit (1) reduces the output of the projector when the motion amount detected by the state detection unit is a predetermined first threshold or more and is less than a second threshold, which is more than the predetermined first threshold, and (2) stops the output of the projector when the motion amount is the second threshold or more.

15. A portable information processing device comprising:
(a) a main body comprising a projector configured to project an image;
(b) a state detection unit configured to detect a state of the main body; and
(c) an output control unit configured to control an output of the projector based on the state of the main body detected by the state detection unit,
wherein the main body further comprises a communication interface configured to communicate to and from an external device,
wherein the state detection unit detects incoming of a message to the communication interface from the external device,
wherein the output control unit reduces the output of the projector when the state detection unit detects the incoming of the message, and
wherein the message of the incoming message detected by the state detection unit includes a phone call or an e-mail message from an external device.

16. An output control method for a projector, which is to be executed by a portable information processing device comprising (a) a projector configured to project an image and (b) a communication interface configured to communicate to and from an external device, the output control method comprising:
detecting a state of the portable information processing device, and
controlling an output of the projector based on the state of the information processing device,
wherein, in the detecting step, an incoming of a message to the communication interface from the external device is detected,
wherein, in the controlling step, the output of the projector is reduced when the incoming of the message is detected in the detecting step,
wherein, in the detecting step, a motion amount quantitatively indicating a motion of the projector is detected after the output of the projector is reduced, and
wherein, in the controlling step, the output of the projector is stopped when the motion amount detected in the detecting step is a predetermined first threshold or more.

17. An output control method for a projector, which is to be executed by a portable information processing device comprising (a) a projector configured to project an image and (b) a communication interface configured to communicate to and from an external device, the output control method comprising:
detecting a state of the portable information processing device, and
controlling an output of the projector based on the state of the information processing device,
wherein, in the detecting step, an incoming of a message to the communication interface from the external device is detected,
wherein, in the controlling step, the output of the projector is reduced when the incoming of the message is detected in the detecting step,
wherein, in the detecting step, a response operation of a user is detected on the incoming of the message, and
wherein, in the controlling step, the output of the projector is stopped when the response operation is detected in the detecting step.

18. An output control method for a projector, which is to be executed by a portable information processing device comprising (a) a projector configured to project an image and (b) a communication interface configured to communicate to and from an external device, the output control method comprising:
detecting a state of the portable information processing device, wherein an incoming of a message to the communication interface from the external device is detected;
controlling an output of the projector based on the state of the information processing device; and
vibrating a main body in response to the incoming of the message,
wherein, in the controlling step, the output of the projector is reduced when the incoming of the message is detected in the detecting step, and
wherein, in the controlling step, the output of the projector is stopped when the main body is vibrated in response to the incoming of the message.

19. An output control method for a projector, which is to be executed by a portable information processing device comprising (a) a projector configured to project an image and (b) a touch sensor configured to receive a touch operation of a user, the output control method comprising:
detecting a state of the portable information processing device, and
controlling an output of the projector based on the state of the information processing device,
wherein, in the detecting step, it is detected that the touch operation is performed on the touch sensor,
wherein, in the controlling step, the output of the projector is reduced when it is detected in the detecting step that the touch operation is performed, and
wherein, in the controlling step, the output of the projector is stopped when a motion amount detected in the detecting step is a predetermined first threshold or more.

20. An output control method for a projector, which is to be executed by a portable information processing device comprising (a) a projector configured to project an image and (b) a communication interface configured to communicate to and from an external device, the output control method comprising:
detecting a state of the portable information processing device, and
controlling an output of the projector based on the state of the information processing device,
wherein, in the detecting step, an incoming of a message to the communication interface from the external device is detected,
wherein, in the controlling step, the output of the projector is reduced when the incoming of the message is detected in the detecting step, and wherein the message of the incoming message detected in the detecting step includes a phone call or an e-mail message from an external device.

21. A portable device comprising:

a projector device configured to project an image;

a communication unit configured to accept an incoming of a phone call or an e-mail message transmitted from an external device; and an output control unit configured to determine whether output of the projector device is set to a predetermined level or stopped in response to acceptance, by the communication unit, of the incoming of a phone call or an e-mail message.

22. The portable device according to claim 21, further comprising:

one or more sensors configured to detect motion of the portable device, wherein the output control unit determines whether the output of the projector device is set to the predetermined level or stopped based on the motion of the portable device which is detected by the one or more sensors after the incoming of a phone call or an e-mail message is accepted.

23. The portable device according to claim 21, further comprising:

an acquisition unit configured to acquire operation information related to operation inputted to the portable device, wherein the output control unit determines whether the output of the projector device is set to the predetermined level or stopped in accordance with a response operation with respect to the incoming of a phone call or an e-mail message being inputted to the portable device after the incoming of a phone call or an e-mail message is accepted.

24. The portable device according to claim 21, wherein the output control unit determines whether the output of the projector device is set to the predetermined level or stopped after the output of the projector device is attenuated from the predetermined level in response to reception of the incoming of a phone call or an e-mail message.

* * * * *